UNITED STATES PATENT OFFICE.

GEORG LEBBIN, OF BERLIN, GERMANY.

PURIFYING MEAT EXTRACT.

SPECIFICATION forming part of Letters Patent No. 674,781, dated May 21, 1901.

Application filed November 27, 1900. Serial No. 37,876. (No specimens.)

*To all whom it may concern:*

Be it known that I, GEORG LEBBIN, doctor of chemistry, a subject of the German Emperor, and a resident of No. 4 Dreysestrasse, Berlin, in the Empire of Germany, have invented a certain new and useful Improved Purifying Meat Extract, of which the following is a clear, full, and exact description.

This invention relates to a process of producing a light-colored extract of meat free from products of decomposition. An extract of meat should, in fact, be nothing else than a highly-concentrated bouillon deprived of fat and albumen. The manner of obtaining the ordinary extract of course corresponds to this definition, but not the product itself, because hitherto during the concentration products of decomposition were always formed which could not be avoided and which led to the result that when redissolving the extract instead of the original solution, the known light-yellow bouillon, a dark-brown solution was obtained, which is hardly equivalent to a natural bouillon. Aroma, taste, and color undergo a great change in consequence of the decomposition taking place during evaporation. According to investigations made by me the cause of the existence of such products of decomposition is due to the reciprocal action between the iron salts always present in meat and flesh juice or blood, respectively, and the albumen of gluten of the meat.

This process has therefore for its object to remove the troublesome iron salts, which is accomplished by temporarily making the acid reaction of the broth, produced in the usual manner and deprived of coagulable albumen, alkaline. For this purpose, for instance, all kinds of suitable lyes, alkaline carbonates, or the like are added to the meat in quantities of one-tenth to one per cent. of the meat employed, thus producing in the broth a precipitation of phosphate of iron which dissolves in the acid broth and that can be removed by filtration. The alkaline broth is then again brought to the original acidity by adding the calculated quantities of acid.

The following may serve as an example for carrying out the process: One hundred liters of broth, produced from about twenty-five kilograms of meat, are mixed with one-fourth kilogram bicarbonate of soda. In order to more rapidly separate the precipitate produced, the mixture may be boiled. After the filtration of the broth about one hundred and eight grams of anhydrous hydrochloric acid are added thereto. The reaction taking place is represented by the following formula:

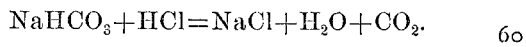
$$NaHCO_3 + HCl = NaCl + H_2O + CO_2.$$

Consequently a broth is produced having a certain proportion of chlorid of sodium. If distilled or rain water is employed for producing the broth, the supply of non-meat salts to the extract caused by the described process is considerably less and inessential as compared with those extracts which are produced in the usual manner by employing well-water calculated to contain about one gram salt to one liter water. The further treatment of the broth or evaporation for producing the extract is effected in the usual manner.

Having now particularly described and ascertained the nature of the said invention, I declare that what I claim, and wish to secure by Letters Patent, is—

1. The herein-described process for producing a light-colored extract of meat, by treating broth deprived of coagulable albumen, consisting in making said broth alkaline to form and precipitate phosphate of iron, filtering the same, and then bringing the filtered liquid to its original acidity.

2. The herein-described process for treating meat broth deprived of coagulated albumen, consisting in mixing therewith bicarbonate of soda, filtering the same and finally adding hydrochloric acid.

In witness whereof I have hereunto set my hand in presence of two witnesses.

GEORG LEBBIN.

Witnesses:
HENRY HASPER,
WOLDEMAR HAUPT.